US012529361B2

(12) United States Patent
Wyatt

(10) Patent No.: US 12,529,361 B2
(45) Date of Patent: Jan. 20, 2026

(54) FRAMESHIFT GENERATOR

(71) Applicant: Douglas C Wyatt, New York, NY (US)

(72) Inventor: Douglas C Wyatt, New York, NY (US)

( * ) Notice: Subject to any disclaimer, the term of this patent is extended or adjusted under 35 U.S.C. 154(b) by 0 days.

(21) Appl. No.: 18/382,529

(22) Filed: Oct. 22, 2023

(65) Prior Publication Data
US 2024/0159226 A1    May 16, 2024

Related U.S. Application Data

(60) Provisional application No. 63/418,510, filed on Oct. 22, 2022.

(51) Int. Cl.
*F03G 7/10*    (2006.01)

(52) U.S. Cl.
CPC .................... *F03G 7/119* (2021.08)

(58) Field of Classification Search
CPC .................. F03G 7/119; F16F 15/30
USPC ..... 74/5.8, 5.37, 5.7, 5.9, 5.95; 446/46, 257, 446/233; 33/318, 321, 324, 228, 275 G; 73/504.02, 504.08, 504.18, 507, 510, 511, 73/512; 356/459; 378/15
See application file for complete search history.

(56) References Cited

U.S. PATENT DOCUMENTS 4,643,034 A * 2/1987 Favatella ............... G01C 19/02
310/90.5
11,229,409 B2 * 1/2022 Deutschmann ........ A61B 6/462

2004/0173037 A1 * 9/2004 Guerrero ................ B64G 1/285
74/5.34
2023/0268099 A1 * 8/2023 Hattori .................. H01B 12/06
174/125.1

FOREIGN PATENT DOCUMENTS

EP         3648316 A1 *  5/2020 ............. F03B 13/10
WO    WO 2017/105293       6/2017

OTHER PUBLICATIONS

"Gravitation" by Misner, Thorne and Wheeler (2017).
"Gravitation and Spacetime", by Ohanian and Ruffini 3d Ed. (2013).
"On the history of the so-called Lense-Thirring effect" Pfister (2006).
"The Confrontation between General Relativity and Experiment" Will (2006).
"A Theory of the Podkletnov Effect based on General Relativity: Anti-Gravity Force due to the Perturbed Non-Holonomic Background of Space" Rabounski (2007).
"About Gravitomagnetism" Malekolkalam (2009).
"Anomalous Fiber Optic Gyroscope Signals Observed above Spinning Rings at Low Temperature" Tajmar (2009).
"Gravity Probe B: Final Results of a Space Experiment to Test General Relativity" Everitt (2011).
"Gravity Probe B data analysis: III. Estimation tools and analysis results" Conklin (2015).
"The Gravity Probe B test of general relativity" Everitt (2015).
"Gravity Probe B data analysis: I. Coordinate frames and analysis models" Silbergleit (2015).

(Continued)

*Primary Examiner* — T. Scott Fix

(57) ABSTRACT

An apparatus is provided which utilizes a plurality of heavy spinning masses in a coplanar and coaxial orientation which when utilized together magnify and reinforce frame dragging effect and create a frameshift.

15 Claims, 8 Drawing Sheets

(56) References Cited

OTHER PUBLICATIONS

"A Derivation of the Kerr Metric by Ellipsoid Coordinate Transformation" Chou 2020.
"A study of clock effects in Newton Maxwell formalism", Hajra (2020).
"Deconstructing Frame-Dragging" Herrera (2021).
"Assessment of the relativistic rotational transformations", Kipreos (2021).
"Superconductor in static gravitational, electric and magnetic fields with vortex lattice", Ummarino (2021).
"The Mossbauer rotor experiment and the general theory of relativity", Corda (2021).
"Gravitational Time Dilation inside the Solid Sphere" Rybicki (2022).
"Levitating rotating globe" Amazon.com (2025).

\* cited by examiner

FRAMESHIFT GENERATOR

PRIORITY

This application claims priority to the U.S. Provisional Application Ser. No. 63/418,510, having a filing date of Oct. 22, 2022, the entire contents of which are all relied upon and fully incorporated herein by reference.

FIELD OF THE INVENTION

The field of the invention relates to astrophysics, and gravitation, more particularly nonlinear gravitodynamics and use of experimental gyroscopes for measurement of physical phenomena. More specifically, the present invention relates to the design of a frameshift generator apparatus that utilizes a plurality of heavy spinning masses which, when utilized together, magnify and reinforce frame-dragging effect.

BACKGROUND OF THE INVENTION

In 2011, results of the Gravity Probe B experiment were published, describing a unique experiment to test and confirm predictions of Einstein's theory that space and time are not the immutable rigid structures of Newton's universe but are united as space-time, and together they are malleable and workable.

Space-time is a construct we have devised to describe how celestial bodies and space affect one another. It is not an "ether" or other underlying tangible medium that can be interacted with by conventional forces. As John Archibald Wheeler said "Spacetime tells matter how to move; matter tells spacetime how to curve."

It is known that a massive body, such as the Sun, warps space-time. For example, during a solar eclipse, one may see the light from background stars, which light has been bent around the Sun, and would otherwise not be seen as they would be occluded by the sun until Earth proceeds in its orbit until the star behind the Sun is no longer blocked by the orb of the Sun.

The warping of space-time can be represented as a curvature of the metric defining space and time. Astronomical orbits, such as the orbit of planet Mercury around the Sun, the orbit of the moon around the Earth as well as orbits of artificial satellites around the Earth are affected by the massive object around which they orbit. The orbiting satellite exhibits a procession in their respective orbits. The precession of an orbiting object follows the curvature of space time around a nonrotating massive object and is generally known as geodetic precession, or the DeSitter effect.

A massive rotating body warps spacetime in a further manner—the rotation of its mass will "drag" spacetime with it. Accordingly, the frame dragging effect has been observed to add an additional precessional rotation to the geodetic precession of an orbiting object following the curvature of spacetime around a rotating massive object.

It is generally accepted that Joseph Lense and Hans Thirring derived a relationship known as the Lense-Thirring effect, or frame dragging effect. Frame-dragging is an additional gravitational component for a moving object that is independent and distinguishable from a gravitational field of a body associated with its mass, as described in traditional Newtonian mechanics. The terms gravitoelectromagnetism, and gravitomagnetism have been also used to refer to the frame dragging effect, as the effect's observational characteristics has analogies to classical electromagnetism.

A background and understanding of nonlinear Gravitodynamics and Lense-Thirring theory is useful here. "Gravitation" by Misner, Thorne, and Wheeler (2017) and "Gravitation and Spacetime", by Ohanian and Ruffini, 3d Ed. (2013) are useful background teachings, both of which are incorporated herein by reference.

The frame dragging effect can be modeled and approximated by a number of methods of varying complexity. For example, the Einstein Field Equations (EFE) can provide a mathematical model for a particular circumstance. However, since the EFE comprise a set of 10 non-linear partial differential equations, solutions can be challenging to obtain. The Kerr metric is one particularly useful solution for a slowly rotating mass, having a line element that is readily accessible.

Other solutions and approximation can be made as understood by a person of ordinary skill in the art according to the circumstances. For example, converting a model to a cylindrical coordinate system may allow for a simplified metric. Alternatively, a person of ordinary skill in the art may adopt certain assumptions according to the circumstances which obviate the requirements of GR and instead allow for estimations using only aspects of Special Relativity, and Lorentz Transformations.

Specifically, a time-shifted frame can exhibit frame drag and retains the physical properties of the frame but in a Lorentz shifted manner. For example, a clock on a satellite orbiting the earth will measure different rate of time as compared to a clock on Earth by a Lorentz shift. Accordingly forces internal to the accelerated or time shifted frame such as tensile forces will experience a shift due to the time dependency of the force. Forces internal to the frame, such as electromagnetic forces, and physical tensile and strain forces become relative to external frames according to a Lorentz shift.

Aside from theory and mathematical formalism, several significant experimental activities have been conducted to confirm theory. The LAGEOS satellite, and the more recent Gravity Probe B experiment are notable.

The Gravity Probe B experiment used a satellite with four on-board gyroscopes to measure the precessional effects over a period of time during the satellites orbit of the Earth. The satellite followed a polar orbit about 640 km above the Earth's surface. A relatively low near Earth orbit was chosen since the amount of frame drag produced by a rotating object decreases substantially by distance from the rotating mass. Accordingly, for such an orbit, the geodetic precession was predicted to be about 6.6 arcseconds per year in the plane of the orbit for a polar orbit, i.e. in the north-south direction. In addition, the frame-dragging effect, was predicted to be about 39 milliarcseconds per year, perpendicular to the orbital plane, in the East-West direction.

The Gravity Probe B Experiment intended to measure the gravitomagnetic effect and the procession of a gyroscope to an accuracy of 1%, and provided resulting data having very strong correlation with predicted values. Everitt reported that "Data from four gyroscopes gave a geodetic drift-rate of $-6601.8+/-18.3$ marc-s $yr^{-1}$ and a frame-dragging of $-37.2+/-7.2$ marcs $yr^{-1}$, to be compared with GR predictions of $-6606.1$ and $-39.2$ marcs $Yr^{-1}$ (1 marc-s$+/-4.848\times 10^{-9}$ radians)". NASA conducted further verification of frame-dragging and published results for its twin GRACE satellite experiment.

The Gravity Probe B experiment included specially made gyroscope designed extreme tolerances, made of fused silica and machined to a nearly perfect sphere and homogenous to tolerances of better than one part per million. The silica sphere was approximately the size of a ping-pong ball (40 mm) and coated with a thin film of niobium which was super cooled with liquid helium to 1.8K. The rate of angular velocity for the four gyroscopes was about 4000 RPM and appropriate for the sensitive measurements of the experiment. Other gyroscopes used in commercial aircraft can operate at rotational speeds up to 24,000 RPM. Systems having such high angular velocity provide guidance to improve the effectiveness of an embodiment of an experimental device in accordance with the instant invention.

Earlier experimental efforts to explore relativity go back to Michelson-Morley in 1887, and other experiments, including those that test the equivalence principle are recounted by Will in "The Confrontation between General Relativity and Experiment" (2006). Of particular interest are experiments related to the so-called "Podkletnov effect." Several terrestrial experimental systems which explore the Podkletnov effect include electromagnetic means to support and controllably rotate a test object such as a disk or cylinder. Included in such systems are cryogenic means providing sufficient cooling to enable superconductivity. Means of suspension included an alternating magnetic field produced by an electromagnet beneath the rotating disk. Electromagnets or solenoids have been used for providing rotation. Such methods are well within the capacity of a person of ordinary skill in the art, as well as methods used in the Gravity Probe B experiment—which utilized a gas jet of helium to induce the rotation of the gyroscope sphere.

It is to be understood that both the foregoing and the following descriptions are exemplary and explanatory only and are not restrictive of the invention, as claimed. Specific examples are included in the following description for clarity, but various details can be changed within the scope of the present invention.

SUMMARY OF THE INVENTION

An apparatus is provided that utilizes a plurality of heavy spinning masses which when utilized together magnify and reinforce frame dragging effect. Previously, experimental devices, such as in the Gravity Probe B Experiment, measured frame-dragging effect of slowly rotating heavy masses, such as the earth, and when measured over a long period of time, produced a frame-dragging effect that was measurable by the sensitive instruments of the gravity probe B experiment. While conventional gyroscopes having singular rotational apparatuses have measured the minute changes of the local frame of the experimental apparatus, heretofore, no devices or experimental apparatuses have utilized the frame-dragging effect in their local frames because of limitations of material tolerances prevent the use of conventional gyroscope or spinning objects to the extreme and angular velocities required to produce significant usable effects. The instant invention overcomes the limitations of material tolerances by producing a local frame-dragging effect within the material, whereby the stresses are abated within the local frame.

At times described herein, one or more "frames" are referred to, and it is understood by a person of ordinary skill in the art in the field of the invention that such frames are understood as frames of space-time, and wherein mass and energy existing in these frames of space-time define relativistic effects with respect to other frames dependent upon effective masses and rates of relative velocity. In particular, "substantial rates" of spin wherein relativistic effects can be perceived within a reasonable timeframe according to the desired scale and use by the reader of this disclosure of a device according to the invention. While various embodiments are possible to be within the scope of the invention, a preferred embodiment is provided herein having a particular range of "effective mass" and "substantial rate" to make a device according to the invention for use with experimentation of frameshift generation properties of the instant invention.

For example, a preferred subject mass can be provided with "effective mass" by being fabricated as a disk from the dense metal and homogenous to at least one part in $10^6$. The material chosen should be sufficient to sustain substantial angular velocity and resist the strain associated with forces when accelerated spin over 1000 rpm. Titanium is a viable choice of material, but other dense metals can be used if fabricated properly. In one further embodiment, niobium is included and will be addressed later. By further example, "substantial rate" is a rate much greater than conventional gyroscopes by a factor of 100-1,000. The requirements of the instant invention are significantly different from the requirements of gyroscopes, which are typically used as measurement instruments and value accuracy and precision. For example, the Gravity Probe B required tolerances of the sphere to the machined to be spherical and homogenous to a tolerance of better than one part per million to satisfy the accuracy of measurement. While desirable, such tolerances are not necessary, provided the chosen material can sustain the forces while the apparatus according to the invention is permitted to "spin up" and shift the frame of the materials undergoing the extreme stresses.

BRIEF DESCRIPTION OF THE DRAWINGS

A preferred embodiment of the invention has been chosen for detailed description to enable those having ordinary skill in the art to which the invention pertains to understand how to construct and use the invention readily and is shown in the accompanying drawings in which.

The above-referenced figures are not to scale and are for reference only to assist the reader in understanding the invention in conjunction with the detailed written description that follows.

DETAILED DESCRIPTION OF THE INVENTION

Figure 1:
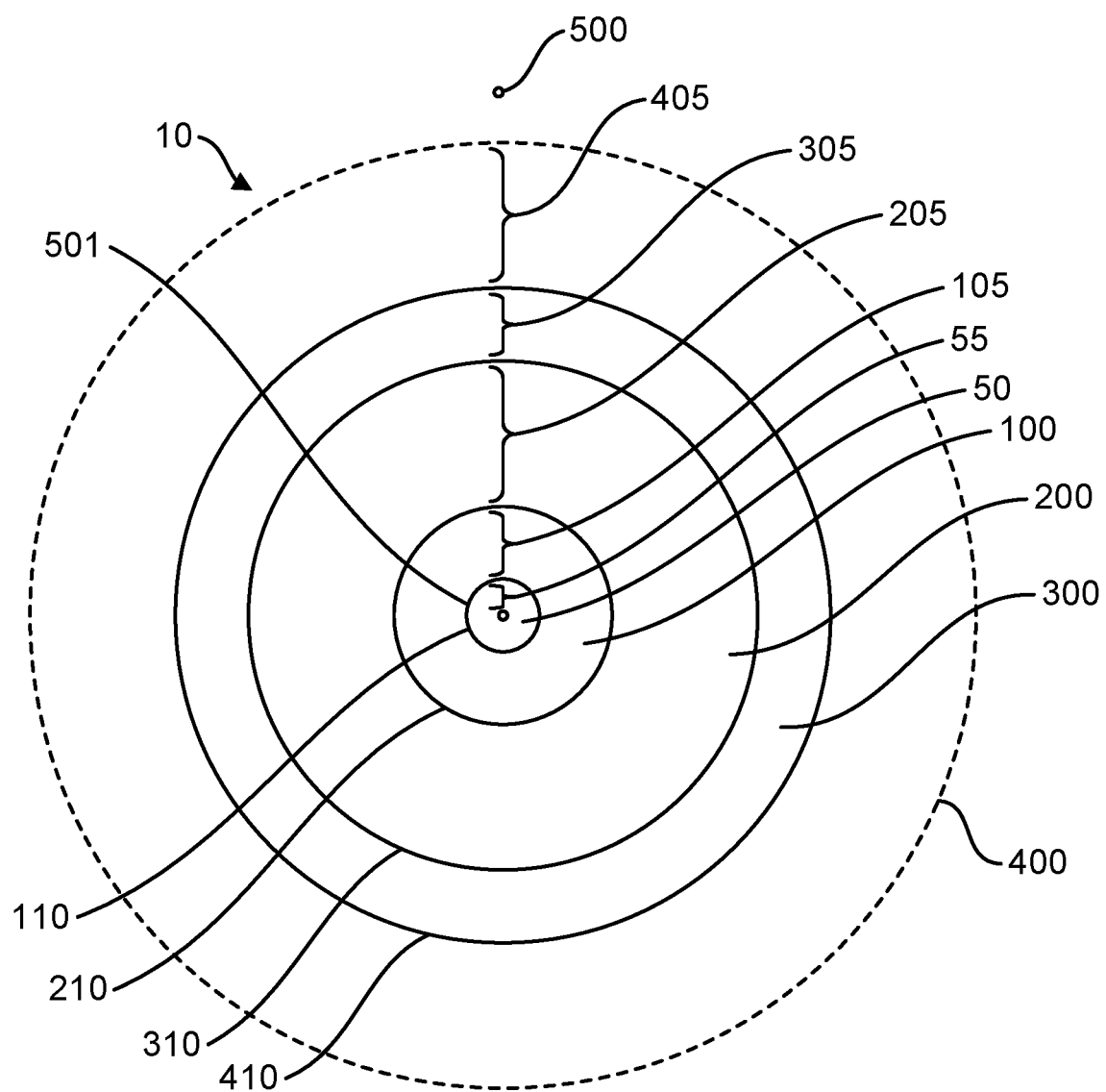
FIG. 1 is a conceptual diagram of a top view of a portion of an embodiment of a frameshift generator according to the invention, showing the subject mass and plurality of rotational masses.
Figure 5:
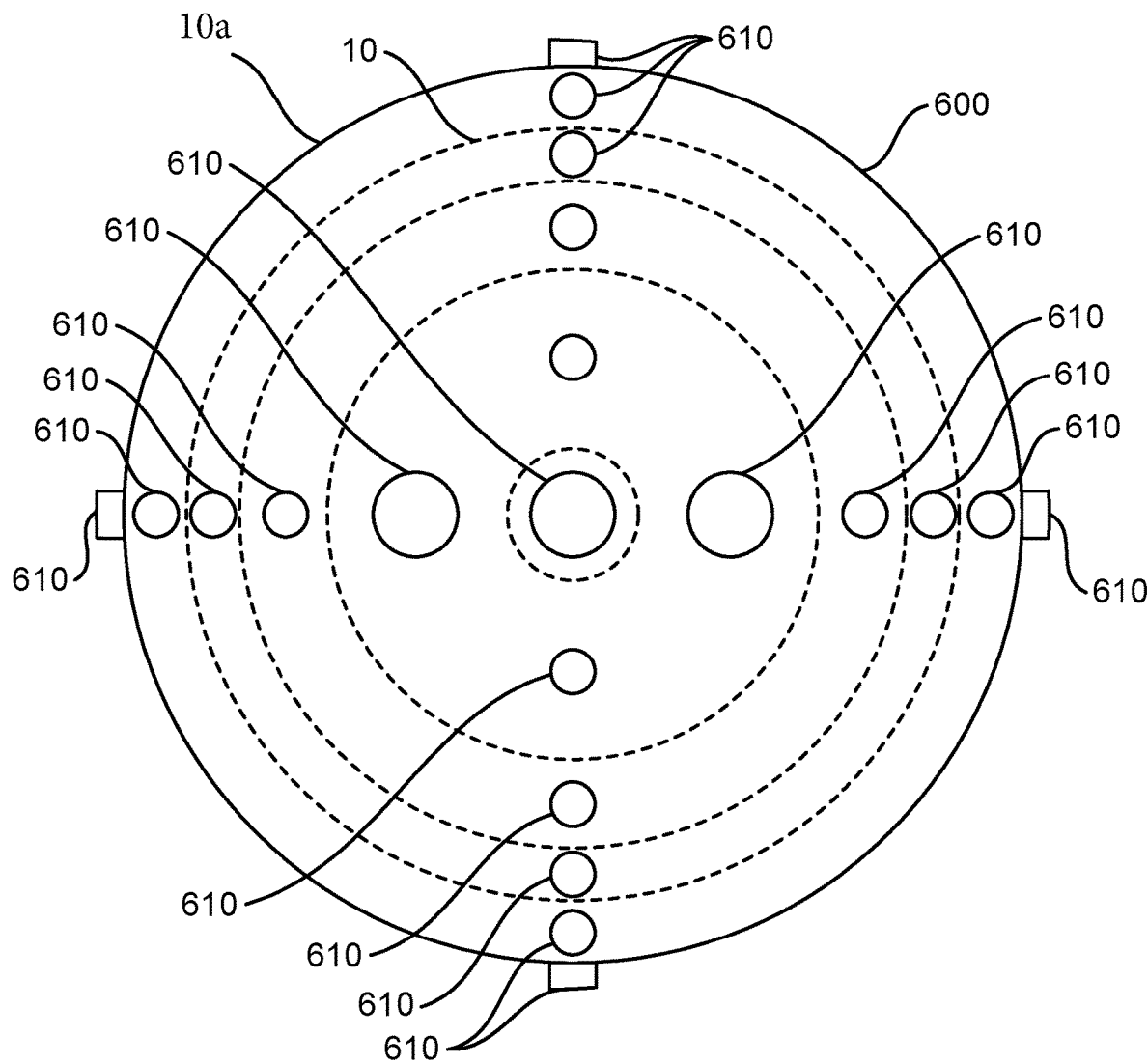
FIG. 5 is a conceptual diagram of a portion of an embodiment of a frameshift generator according to the invention from a side-top view showing housing and housing ports.
Figure 6:
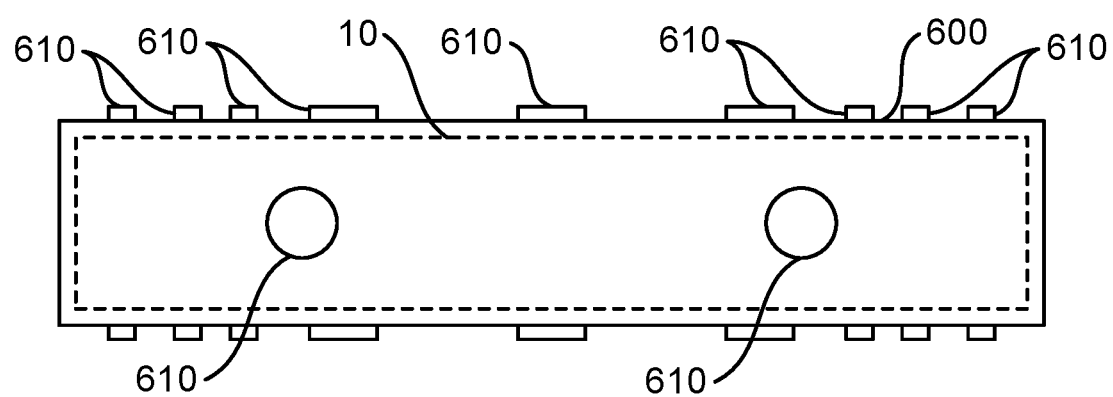
FIG. 6 is a conceptual diagram of a portion of an embodiment of a frameshift generator according to the invention from a side view showing primary and secondary movers.

FIG. 1 shows an embodiment of frameshift generator 10 according to the invention. The embodiment shown in FIG. 1 includes a subject mass 50, a center axis 501, and a plurality of rotational masses 100, 200, 300, which collectively are represented as 10a in FIG. 1 for purposes of clarity and introduction. The frameshift generator 10 can also include a housing 600, a prime mover 620, and at least one secondary mover 630, as shown in FIGS. 5 and 6 and described further below.

The subject mass 50 is disposed in a first reference frame 801 at the center axis 501 within the apparatus having an "effective" mass and adapted to be subject to a "substantial rate" of spin. "Effective mass" and "substantial rate" of spin are described further herein. The subject mass 50, for example, can be fabricated from titanium as a disk of 10 cm radius×4 cm, (subject radius 55) and preferably homogenous within one part $10^6$. The subject mass 50 is the first driver of the frameshift generator and produces a small "frame-dragging" effect, or first induced frame drag 802, upon reaching its predetermined maximum rotational velocity for a particular design tolerance when spun up by the prime mover 620, described further below in FIGS. 5 and 6.

An embodiment of the frameshift generator 10 also includes a plurality of rotational masses 100, 200, 300. In one embodiment, a first rotational mass 100 is provided, having a first substantial mass (and first added radius 105), and in a preferred embodiment, is provided as a ring fabricated from dense homogenous material such as titanium. Again, considerations of choice of material are similar to that of the subject mass 50. The first rotational mass 100 is uniformly distributed as a homogenous ring around the subject mass and in immediate proximity to the outer edge of the disk of the subject mass 50, separated by at least a first spacing 110. In one embodiment, the first rotational mass is provided as a ring with an inner diameter of a little more than 5 cm (depending on the choice of first spacing 110) and an outer diameter of 8 cm (first added radius 105) and having a width matching the chosen width of the subject mass 50 and coaxial with the subject mass center axis 501. (Thus adding to the effective radius of the rotational generator). In one embodiment, a vacuum is provided in the first spacing 110. However, in alternative embodiments, the first spacing 110 can include cryo-materials such as liquid helium. The size of the first spacing 110 between the first rotational mass 100 and the second rotational mass 200 is preferably as small as tolerances will allow, depending on whether the housing 600 is filled with liquid helium or other cryo-material 705 (as additional spacing will delay the "spin up"). For example, in an alternative embodiment, the first rotational mass 100 can be coated with a thin layer of niobium and supercooled to take advantage of the effect of London moment to help "spin up" the first rotational mass without requiring a secondary mover 630.

An embodiment of the frameshift generator includes a second rotational mass 200 and shares the same fabrication considerations as that of the first rotational mass 100. The second rotational mass has a second substantial mass and is uniformly distributed in a ring around and proximate to the first rotational mass. For example, in one embodiment, a second rotational mass 200 is provided as a titanium ring having an inner diameter of a little more than 8 cm (depending on the choice of second spacing 210) and an outer diameter of approximately 10 cm. The second rotational mass is coplanar with both the first rotational mass and the subject mass and likewise is coaxial with the center axis and axis of rotation of the first rotational mass. The second rotational mass is provided in close proximity to the first rotational mass and separated by a second spacing 210, which again is preferably as close as tolerances will allow.

As shown in FIG. 1, a further embodiment of a frameshift generator 10 according to the invention can include a third rotational mass 300, provided as a homogenous ring with an effective mass, and separated from the second rotational mass 200 by a third spacing 310. Again, the third rotational mass 300 is coplanar and coaxial with the first and second rotational masses and shares the same fabrication considerations. In one embodiment, the third rotational mass has an added effective radius 405, and can be designed as a titanium ring with an inner diameter of little more than 10 cm and an outer diameter of 12 cm. The dimensions of the plurality of rotational masses preferably match the thickness (h) of the subject mass 50.

Also shown in FIG. 1 is a frame perimeter 410, which defines the outer edge of the effective moving frames of the frameshift generator 10, a measured frame distance 405, and reference measurement point 500, which are provided for reference which are described further below, and help explain how the frameshift generator 10 can be used in different circumstances.

Figure 2:
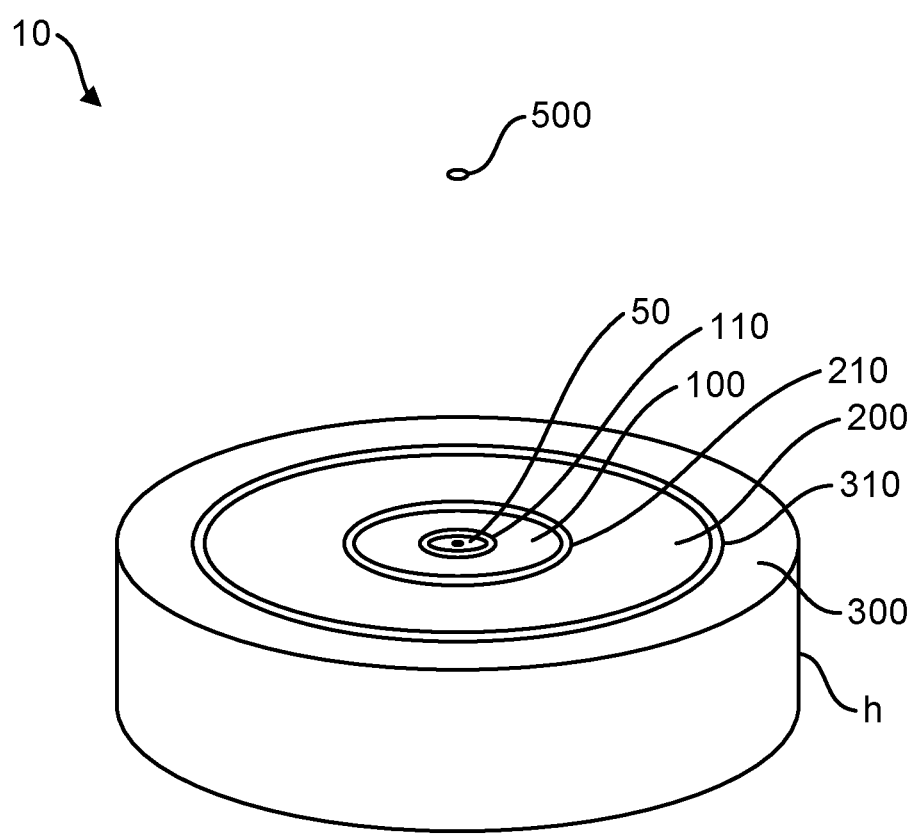
FIG. 2 is a conceptual diagram of a portion of an embodiment of a frameshift generator according to the invention from a side perspective view.

FIG. 2 shows a portion 10a of an embodiment of a frameshift generator 10 according to the invention from a side perspective view. In addition to the structures described above with respect to FIG. 1, FIG. 2 shows a plurality of control signal devices 510 disposed on a top surface of the subject mass 50, and a top surface of each of the plurality of the rotational masses 100, 200, 300. The control signal device 510 is preferably provided as a reflective surface for receiving and reflecting a signal from at least one sensor 520 associated with sensor control system 520, associated with the Gyro control subsystem 730 described further herein. The control signal device 510 provides feedback to the control subsystem 730 for measuring the effective rate of frame drag due to the inertia of the frame-dragging effect, allows the system to measure the rate of increase of angular velocity of the system, and allow the system to "spin up" to prevent damage to the device when operated up to the limits of material tolerances.

Figure 3:
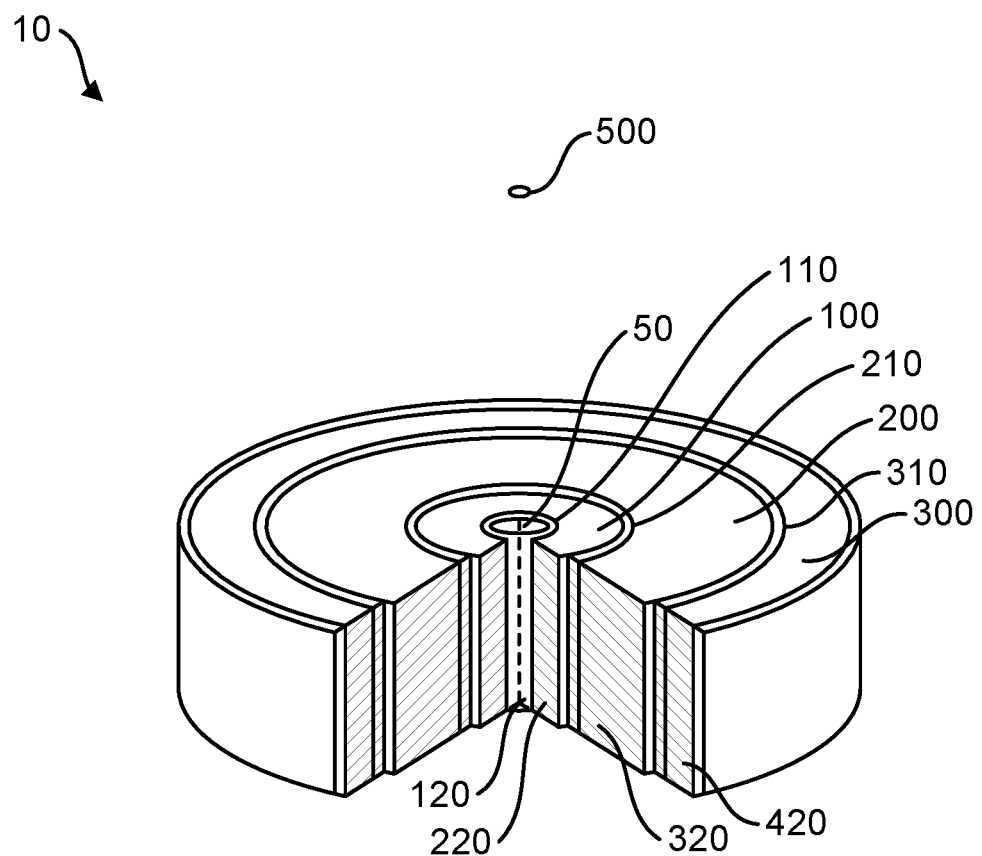
FIG. 3 is a conceptual diagram of a portion of an embodiment of a frameshift generator according to the invention from a side perspective view with a portion cutaway.

FIG. 3 shows a portion 10a of an embodiment of a frameshift generator 10 according to the invention from a side perspective view with a portion cutaway, such as shown in FIGS. 1 and 2. In addition, FIG. 3 shows a reference measure point 500, which is a theoretical point in a frame along the axis 501 of rotation of the device and outside of the effective frameshift generator. Effective masses outside of the frame, such as may exist at reference point 500 can dampen the spin-up of the device, and accordingly, gravitomagnetic shielding can be provided, such as lead (not shown), to prevent dampening of the frame-dragging effect that the apparatus according to the invention is intended to provide. Such shielding is outside the specific focus of the invention, even though it may provide substantial benefits.

Figure 4:
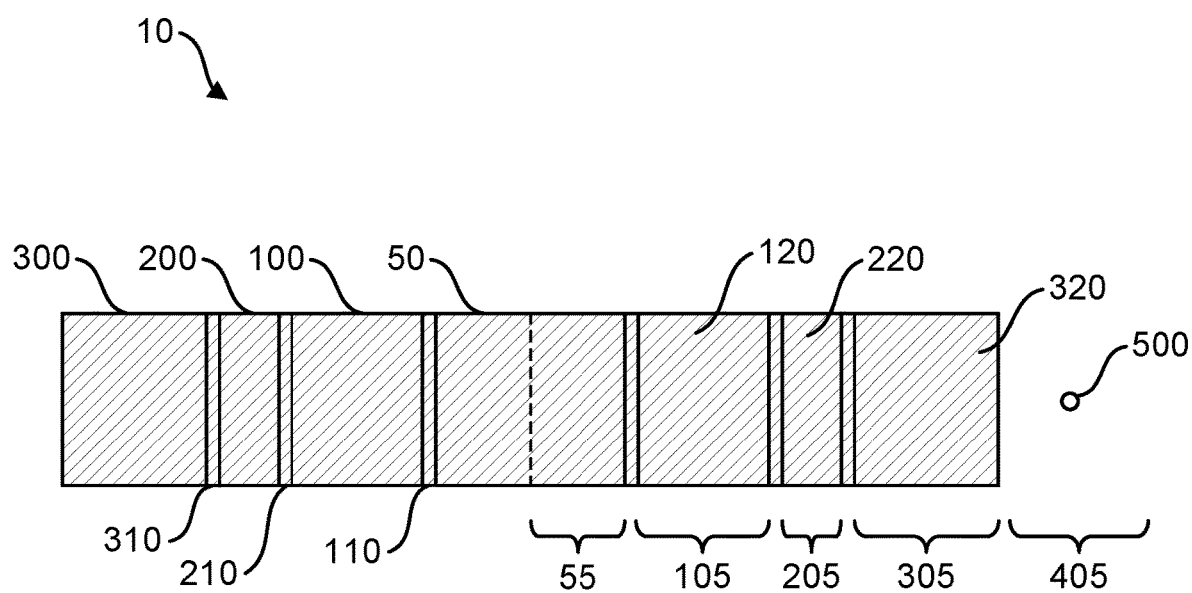
FIG. 4 is a conceptual diagram of a portion of an embodiment of a frameshift generator according to the invention from a side cross-section view.

FIG. 4 is a conceptual diagram of a portion 10a of an embodiment of a frameshift generator 10 according to the invention from a side cross-section view. As shown in FIG. 4, the subject mass and the plurality of rotational masses are disposed within the housing. The subject mass is operatively connected to the prime mover to spin around the center axis in a primary rotational direction at a first substantial rate. The plurality of rotational masses are operatively connected to at least one secondary mover to spin around the center axis in the primary rotational direction at a secondary substantial rate, whereby upon activation of the primary mover causing the subject mass to spin at a substantial rate, the subject mass produces a first induced frame drag upon at least the first rotational mass, and whereby upon activation of the at least one secondary mover causing at least one of the plurality of rotational masses to spin, and thereby at least one of the plurality of rotational masses produces a first additive frameshift upon the subject mass.

FIG. 5 is a conceptual diagram of a portion of an embodiment of a frameshift generator 10a according to the invention from a side top view showing a housing 600 having a plurality of housing ports 610. The housing 600 is a conventional container adapted for containing the portion of the frameshift generator 10, as shown in FIGS. 1, 2, 3 and 4. The housing 600 is preferably adapted to maintain a vacuum within to permit the subject mass 50, and a plurality of rotational masses 100, 200, 300 to spin freely. In one embodiment, the housing can be fabricated from stainless steel or titanium and can include a shielding surface, such as lead. An alternative embodiment, the housing 600 can be designed as a dewar adapted to receive cryo-materials 520, such as liquid helium. A plurality of housing ports 610 are provided as apertures through the housing 600 in order to access the portion of the frameshift generator 10 contained within. Among other things, the housing ports 610 can provide ports for distribution of cryo-material 705 when operatively connected to cryo-subsystem 710. In addition, the housing ports 610 can include control system signal generators 520 for sending signals to measure the rate of spin-up of the subject mass and plurality of rotational masses. In addition, the housing ports 610 can include other sensor devices, such as magnetometers and gravitometers, to measure the performance of the device.

FIG. 6 is a conceptual diagram of a portion of an embodiment of a frameshift generator 10 according to the invention from a side view showing primary mover 620 and secondary movers 630. It can be appreciated by a person of ordinary skill in the art that the primary mover 620 can be one of many conventional means for spinning up conventional gyroscopes. For example, a conventional electric engine with the flywheel such as shown in US 2020/10140102 can be utilized. However, the primary mover 620 is adapted for use with higher tolerances of the instant invention and should be capable of inducing 3 to 4 orders of magnitude additional angular velocity and commensurate torque to be imparted on the subject mass 50. Preferably, the prime mover 620 remains outside of the vacuum chamber of the housing 600 and is electro-magnetically connected to transmit torque to the subject mass 50, and once the desired rate of spin is achieved, the electromagnetic system transmitting power from the primer to the subject mass 50 is disengaged.

Similarly, it can be appreciated by a person of ordinary skill in the art that the secondary movers can be a plurality of conventional electromagnetic devices that drive one or more of the plurality of rotational masses when magnetically coupled. For example, as used in linear magnetically induced transport systems, a plurality of electromagnets can be arranged around in a ring through one or more ports 610 and provide a push-pull to each rotational mass 100, 200, 300 when activated in rotational succession. Furthermore, in one embodiment of the invention where each rotational mass is coated with a thin layer of niobium and supercooled, the London moment provides an initial push to start the spin-up of the rotational mass.

Figure 7:
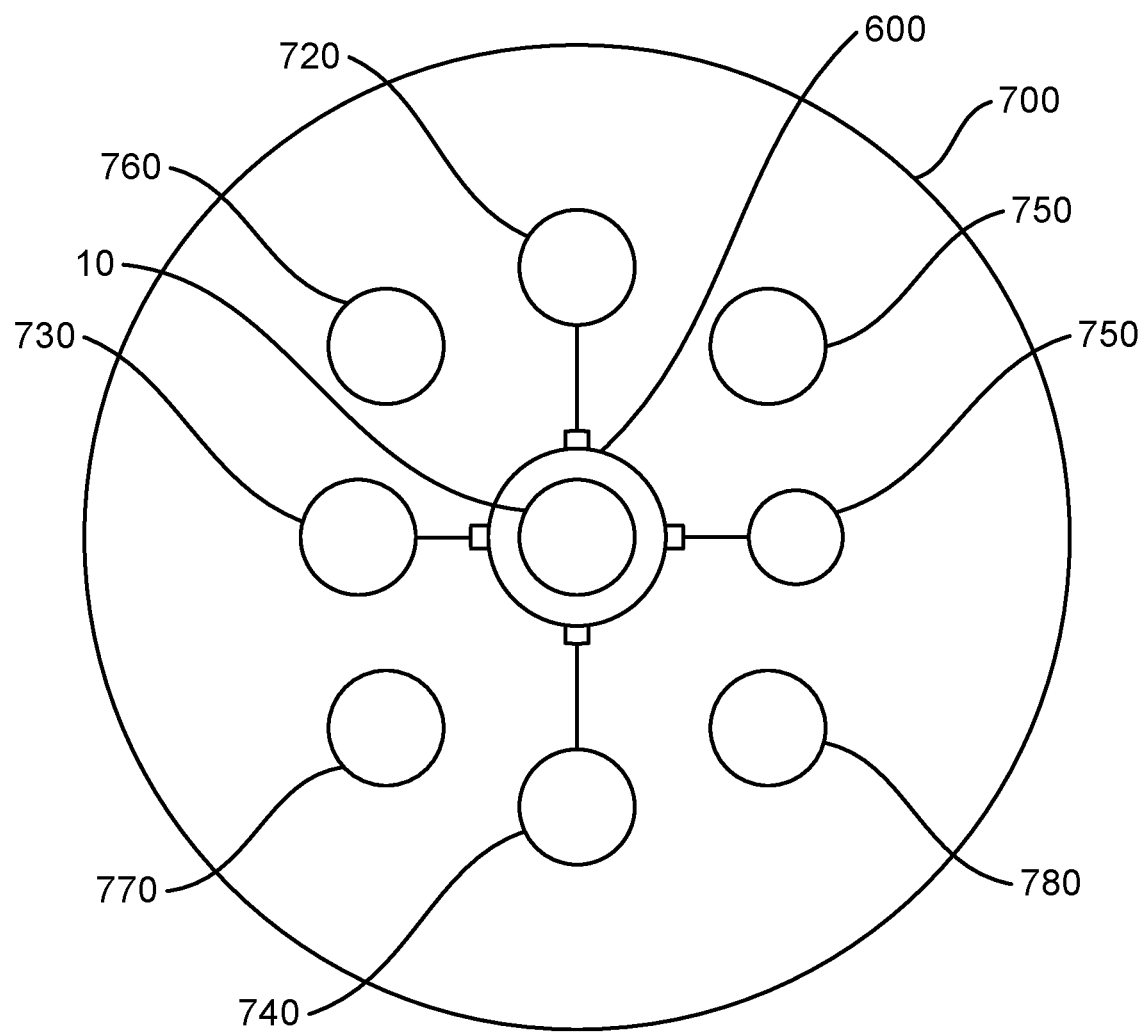
FIG. 7 is a conceptual diagram of an embodiment of a support system for an embodiment of a frameshift generator according to the invention from a top view showing subsystems.

FIG. 7 is a conceptual diagram of an embodiment of a support system 700 for an embodiment of a frameshift generator 10 according to the invention from a top view showing several subsystems. A cryo-subsystem 710 having cryo-material 705 is provided in one embodiment of the invention, where the embodiment of the rotational masses includes niobium coating. In addition, or in the alternative, subsystem 710 can include a vacuum system for maintaining a vacuum within the housing 600. A gyro-control subsystem 730 is provided and operatively connected to the prime mover and secondary mover for moderating the angular velocity of the subject mass and plurality of rotational masses. A Gyro anomaly correction subsystem 740 is provided to correct for and/or prevent damage to the device if one or more sensors detect anomalies or dangerous vibration. An internal communication system 750 is provided for communicating information among the various control systems. Relativistic tracking subsystem 760 is provided and operably connected to the Gyro control subsystem 730 to provide control information to the Gyro control subsystem 730 based on predetermined spin-up timing measurements. A power maintenance subsystem 770 can also be provided, as well as an interface for external systems 780 such as may be required if the device is to be operated within a satellite or spacecraft.

Figure 8:
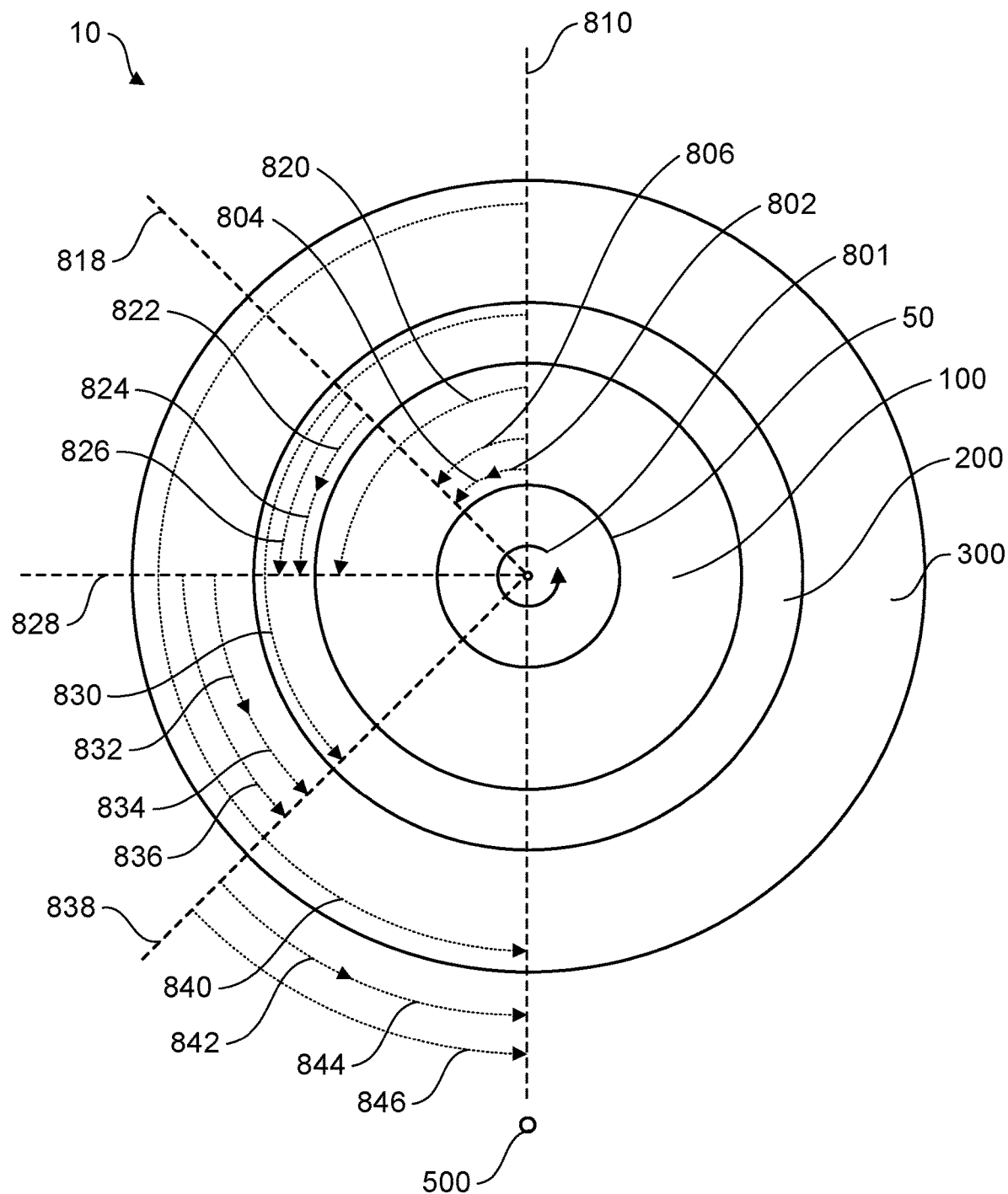
FIG. 8 is a conceptual diagram of frame-shifting effects produced by an embodiment of a frameshift generator according to the invention from a top view.

FIG. 8 is a conceptual diagram of the generation of frame-shifting effects produced by an embodiment of a frameshift generator according to the invention from a top view.

In a preferred embodiment of the invention, the subject mass 50 has an effective mass and density whereby upon achieving a substantial rate of spin on the subject mass 50, a first induced frame drag is induced as upon frames external to the subject mass 50 spatial existence, namely the first rotational mass.

FIG. 8 illustrates the frame-dragging aspects of the device. A first reference frame 801 is shown defining the frame of the subject mass 50. Upon spin-up, a first induced frame drag 802 is produced by the spinning of the subject mass 50 and induces a drag that pulls along the second reference frame 820 associated with the first rotational mass 100. After a period of time, after spin-up of the subject mass 50 to its maximum operational angular velocity, a first additive frameshift 804 is experienced by the first and second frame. Together, the first induced frame drag 802 and the first additive frameshift 804 produce a first frame transformation 806.

As the first rotational mass continues to spin up to its operational velocity, a second induced frame drag 820 is produced. Furthermore, the subject mass 50 and the first rotational mass produce a second additive frameshift. Together, the second induced frame drag 822 and the second additive frameshift 824 produce a second frame transformation 826.

Similarly, as the second rotational mass spins up to its operational angular velocity, it produces a third induced frame drag upon the third reference frame wherein a third induced frame drag 832 is induced and the subject mass 50, first rotational mass, and second rotational mass induce a third additive frameshift 834 which together produces a third frame shift transformation 836.

Where a range of values is provided, every intervening value between the upper and lower limit of that range and any other stated or intervening value in that stated range is included within the invention. The upper and lower limits of these smaller ranges may be included in the smaller ranges and are likewise included within the invention. Where the stated range includes one or both of the limits, ranges excluding either or both of those included limits are also included in the invention.

In the specification and in the appended claims, the singular forms "a," "and," "said," and "the" include plural referents unless the context clearly dictates otherwise. The claims may be so drafted to require singular elements or exclude any optional element. These statements provide an antecedent basis for the use of such exclusive terminology as "solely," "only," and the like in connection with the recitation of claim elements and/or the use of "negative" claim limitations.

While this invention has been described in conjunction with the exemplary embodiments outlined above, the foregoing description of exemplary embodiments of the invention is illustrative, not limiting. The invention is not necessarily so constrained. Many alternatives, adaptations, modifications, and or variations may be apparent to those skilled in the art in view of the teachings provided herein.

The invention claimed is:

1. A frameshift generator, comprising:
    a subject mass, a center axis, a plurality of rotational masses, a housing, a prime mover, and at least one secondary mover,
        wherein subject mass is disposed at the center axis,
            wherein the plurality of rotational masses include at least a first rotational mass and a second rotational mass, wherein the first rotational mass is uniformly distributed in a ring around and proximate to the subject mass,
    wherein the first rotational mass is coaxial with the center axis,
        wherein the second rotational mass is uniformly distributed in a ring around and proximate to the first rotational mass
        wherein the second rotational mass is coplanar with both the first rotational mass and the subject mass, wherein the second rotational mass is coaxial with the center axis,
    wherein the subject mass and the plurality of rotational masses are disposed within the housing,
        wherein the subject mass is operatively connected to the prime mover to spin around the center axis in a primary rotational direction at a first rate,
        and wherein the plurality of rotational masses are operatively connected to at least one secondary mover to spin around the center axis in the primary rotational direction at a second rate,
        whereby upon activation of the primary mover causing the subject mass to spin up to a first rate, the subject mass produces a first induced frame drag upon at least the first rotational mass, and whereby upon activation of the at least one secondary mover causing at least one of the plurality of rotational masses to spin, the at least one plurality of rotational masses produces a first additive frameshift upon the subject mass.

2. A frameshift generator, comprising:
    a subject mass, and a plurality of rotational masses,
        wherein the subject mass has a center axis and a first reference frame,
        wherein the plurality of rotational masses includes at least a first rotational mass having a second reference frame and a second rotational mass having a third reference frame,
        wherein the first rotational mass is distributed in a ring around and proximate to the subject mass, and is coaxial with the center axis,
        wherein the second rotational mass is distributed in a ring around and proximate to the first rotational mass, and wherein the second rotational mass is coplanar with both the first rotational mass and the subject mass, wherein the second rotational mass is coaxial with the center axis,
        and wherein the subject mass is adapted for rotation in a first rotational direction around the central axis up to a first rate, wherein the first rotational mass is adapted for rotation in the first rotational direction around the central axis up to a second rate, and
        wherein the second rotational mass is adapted for rotation in the first rotational direction around the central axis at up to a third rate.

3. A frameshift generator according to claim 2, further comprising a housing, a prime mover, and at least one secondary mover,
    wherein the subject mass and the plurality of rotational masses are disposed within the housing,
    wherein the subject mass is operatively connected to the prime mover to spin around the center axis in the first rotational direction up to a first rate, and wherein at least one of the plurality of rotational masses are operatively connected to at least one secondary mover to spin around the center axis in the primary rotational direction up to a second rate, whereby upon activation of the primary mover, the primary mover induces the subject mass to spin up to a first rate, whereby the subject mass produces a first induced frame drag upon at least the first rotational mass, and whereby upon activation of the at least one secondary mover, the at least one secondary mover induces the first rotational mass to spin up to a second rate, whereby the first rotational mass induces a first additive frameshift upon the reference frame of subject mass.

4. A frameshift generator according to claim 1, further comprising a first spacing wherein the first spacing is disposed between the subject mass and first rotational mass and around a circumference of the subject mass, and wherein the spacing comprises at least one of the group consisting of a vacuum and a cryomaterial.

5. A frameshift generator according to claim 1, wherein said subject mass comprises a uniformly distributed material, selected from the group of consisting of homogenous titanium, and homogenous niobium.

6. A frameshift generator according to claim 1, wherein said plurality of rotational masses comprise uniformly distributed material, selected from the group of materials consisting of homogenous titanium, and homogenous niobium.

7. A frameshift generator according to claim 1, further comprising a third rotational mass wherein the third rotational mass is distributed in a ring around and proximate to the second rotational mass, and is coaxial with the center axis, and wherein is the third rotational mass adapted for rotation in a first rotational direction around the central axis at a third rate.

8. A frameshift generator according to claim 1, further comprising at least one additional rotational mass wherein each one of said additional rotational mass is distributed in a ring around and proximate to at least one of the plurality of rotational masses, and is coaxial with the center axis, and wherein each one of said additional rotational masses is adapted for rotation in a first rotational direction around the central axis at a third rate.

9. A frameshift generator according to claim 1, wherein at least one of said rotational masses further comprises a superconductive coating.

10. A frameshift generator according to claim 1, wherein at least one of said rotational masses further comprises a superconductive ring.

11. A method of generating a frameshift, including the steps of
providing a subject mass and a plurality of rotational masses, wherein the subject mass and at least one of the rotational masses are coaxial and coplanar,
inducing a subject mass to rotate on a center axis, in a first direction,
accelerating the subject mass to up to a first operational angular velocity,
inducing a first frame drag upon a first rotational mass whereby a second reference frame is shifted,
inducing a first rotational mass to rotate on a center axis in a first direction,
accelerating the first rotational mass to up to a second operational angular velocity,
inducing a second rotational mass to rotate on an axis in a first direction, wherein the second rotational mass is uniformly distributed in a ring around and proximate to the first rotational mass
accelerating the second rotational mass up to a third operational angular velocity,
thereby inducing a first additive frameshift to a first reference frame, and thereby providing a first frame transformation.

12. A method according to claim 11, further comprising the steps of accelerating the subject mass to a further operational angular velocity.

13. A method according to claim 11, further comprising the steps of accelerating the first rotational mass to a further operational angular velocity.

14. A method according to claim 11, further comprising the steps of accelerating the second rotational mass to a further operational angular velocity.

15. A method according to claim 11, further comprising the steps of providing a superconductive coating on at least one of said plurality of rotational masses, and accelerating at least of one of said plurality of rotational masses to an operational angular velocity.

* * * * *